(12) United States Patent
Hashimoto

(10) Patent No.: US 7,191,859 B2
(45) Date of Patent: Mar. 20, 2007

(54) DRIVING APPARATUS FOR AN ELECTRIC VEHICLE

(75) Inventor: Takenori Hashimoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 283 days.

(21) Appl. No.: 10/756,999

(22) Filed: Jan. 13, 2004

(65) Prior Publication Data
US 2004/0144576 A1    Jul. 29, 2004

(30) Foreign Application Priority Data
Jan. 16, 2003    (JP)    ............... 2003-007954

(51) Int. Cl.
B60K 6/08    (2006.01)
(52) U.S. Cl. ................... 180/65.4; 180/65.2; 180/65.7; 903/945; 903/919; 477/5
(58) Field of Classification Search ............... 180/65.2, 180/65.3, 65.4, 65.6, 65.7, 65.8; 477/3, 5, 477/6; 903/911, 915, 945, 917, 919, 922
See application file for complete search history.

(56) References Cited

U.S. PATENT DOCUMENTS

| | | | |
|---|---|---|---|
| 6,155,364 A * | 12/2000 | Nagano et al. ............ | 180/65.2 |
| 6,247,437 B1 * | 6/2001 | Yamaguchi et al. ..... | 123/179.3 |
| 6,238,670 B1 | 12/2001 | Minowa | |
| 6,473,683 B1 * | 10/2002 | Nada ........................... | 701/82 |
| 6,520,879 B2 * | 2/2003 | Kawabata et al. ............. | 475/5 |
| 6,523,436 B2 | 2/2003 | Minowa et al. | |
| 6,563,230 B2 * | 5/2003 | Nada ........................ | 290/40 C |
| 6,600,980 B1 * | 7/2003 | Kraska et al. ................ | 701/22 |
| 6,656,082 B1 * | 12/2003 | Yamada et al. ................ | 477/5 |
| 6,784,563 B2 * | 8/2004 | Nada ........................ | 290/40 C |
| 6,991,054 B2 * | 1/2006 | Takaoka et al. ........... | 180/65.2 |

| | | | |
|---|---|---|---|
| 2002/0115516 A1 | 8/2002 | Kawabata et al. | |
| 2002/0179351 A1 | 12/2002 | Shimabukuro et al. | |

FOREIGN PATENT DOCUMENTS

| | | |
|---|---|---|
| JP | 07096759 | 4/1995 |
| JP | 11069509 | 8/1997 |
| JP | 9-226393 | 9/1997 |
| JP | 10-285708 | 10/1998 |
| JP | 2000278809 | 3/1999 |
| JP | 2000-289472 | 10/2000 |
| JP | 2002225578 | 8/2002 |
| WO | WO-99/21263 | 4/1999 |

* cited by examiner

OTHER PUBLICATIONS

Search Report Issued by the European Office dated Aug. 1, 2006.

Primary Examiner—Jeff Restifo
(74) Attorney, Agent, or Firm—Smith, Gambrell & Russell

(57) ABSTRACT

A driving apparatus comprises an electric generator driven by an engine and a motor for driving driving-wheels by using electric power from the electric generator, wherein an engine-side input axle is linked to a crankshaft and an motor-side input axle is linked to a motor rotor and these input axles are linked to an output axle for transmitting power to the driving-wheels. In an engine-power transfer channel constituted by the engine-side input axle 18 and the output axle, there is provided a transmission for changing a revolution speed of the engine-power transfer channel to a plurality shift ranges. When a vehicle is engine-driven, the revolution speed of the engine-power transfer channel is changed, thereby allowing a drive force of the vehicle to be changed.

16 Claims, 13 Drawing Sheets

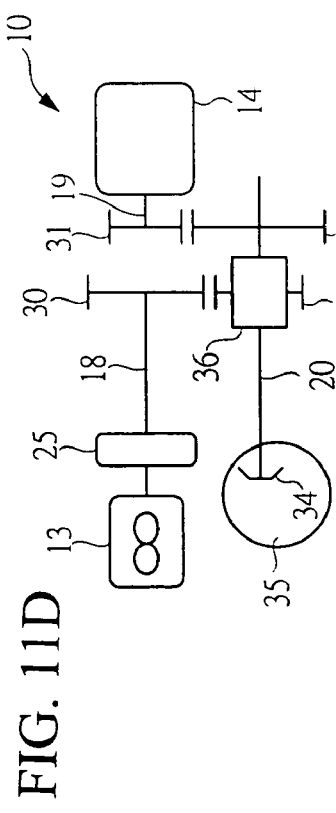
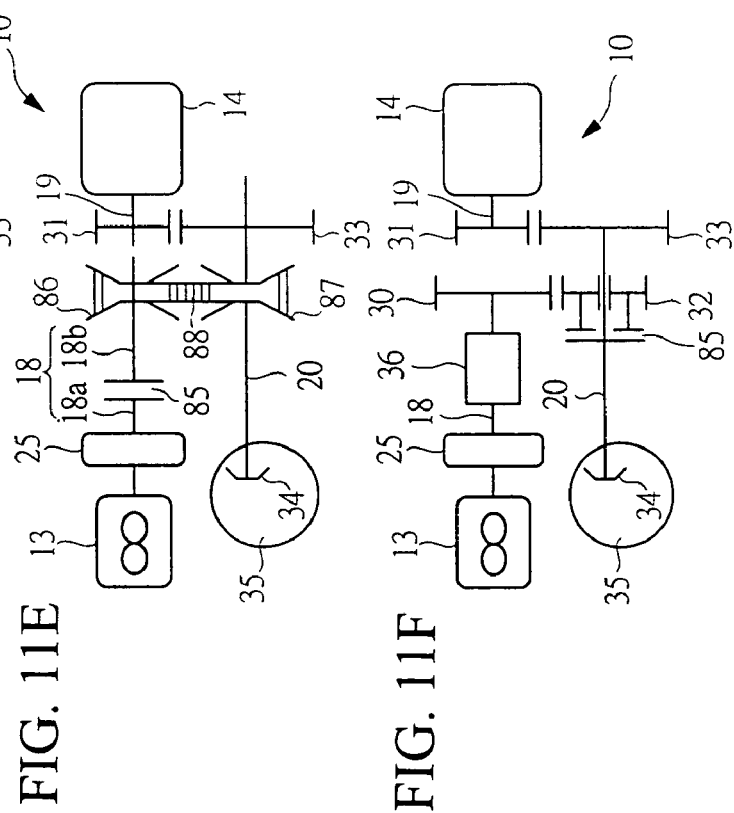
FIG. 11D
FIG. 11E
FIG. 11F
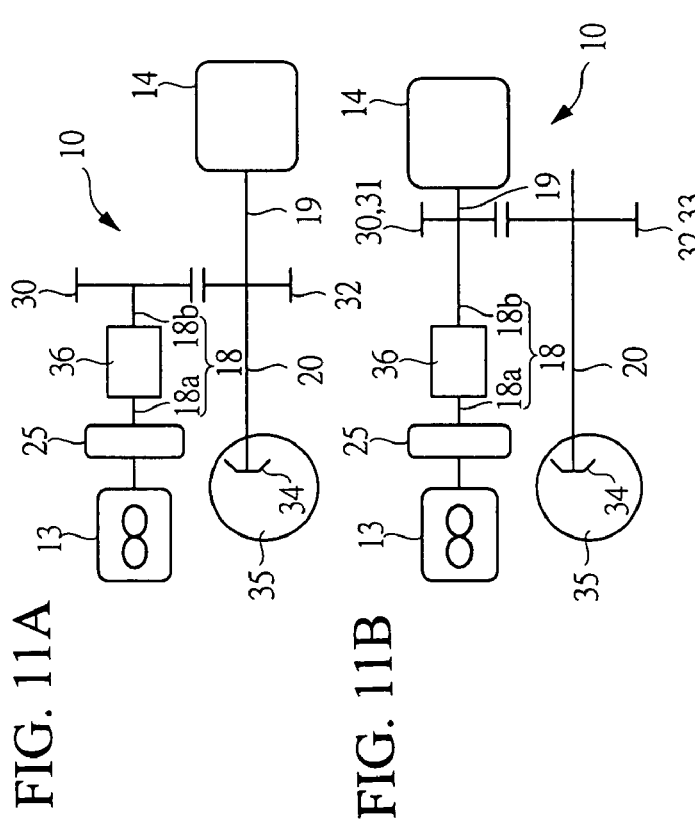
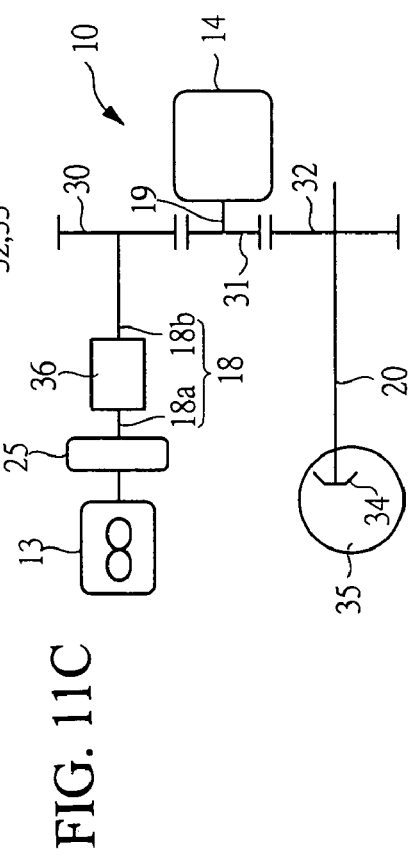
FIG. 11A
FIG. 11B
FIG. 11C

DRIVING APPARATUS FOR AN ELECTRIC VEHICLE

BACKGROUND OF THE INVENTION

The present invention relates to a driving apparatus for an electric vehicle and, particularly, to a technique effectively applied to the driving apparatus for an electric vehicle, which is driven by a plurality of power sources.

An electric vehicle includes a battery accumulating power and a motor driving driving-wheels, and can travel by the power from the charged battery. The electric vehicle has advantages of emitting no exhaust fumes during a vehicle run, having good energy efficiency, and the like while it has the problems that mileage per charge is short and charging time for the battery is long and a troublesome charging work is required.

To solve these problems, a so-called hybrid vehicle has been developed as an electric vehicle equipped with an internal combustion such as a gasoline engine, an diesel engine, or the like in addition to a motor. In driving systems of the hybrid vehicles, there are a series type, a parallel type, and a series-parallel type. The electric vehicle of a series type is such that the battery is charged up to a value of power generated through an electric generator driven by an engine and the vehicle is driven by a motor. Since the engine is used to generate electric power, it can be used through only an efficient revolution speed (for example, see Japanese Patent Laid-open (TOKUKAIHEI) No. 10-285708). The electric vehicle of a parallel type is such that an engine is mainly used as a drive source for a vehicle run and drive power is assisted by the motor at the time of start and/or acceleration at which the vehicle takes loads. When the vehicle takes light loads due to bad engine efficiency, a function of the motor is changed to an electric generator to charge the battery.

Meanwhile, the electric vehicle of a series-parallel type has an electric generator in addition to an engine and a motor. The drive of the vehicle is changed to any one of drive by the engine, drive by the motor, and drive by both drive sources depending on running states, thereby allowing the engine and motor to be used under the efficient conditions. In the electric vehicle having the driving system, the motor is used to drive the vehicle at the time of start at which drive torque is required, and the vehicle is driven by the engine when its speed is increased, and the vehicle is driven by the motor and engine at the time of a uphill run at which it takes heavy loads, and electric power is generated during the vehicle run when the engine takes light load (for example, see Japanese Patent Laid-open (TOKUKAIHEI) No. 9-226393).

SUMMARY OF THE INVENTION

However, in the conventional hybrid type electric vehicle, when the vehicle is driven by the motor, use of the motor with large output is required to satisfy, through the driving of the motor, engine performance requested in a high speed range. This is because the motor has such a property that the drive torque starts decreasing when it exceeds the predetermined revolution speed. Meanwhile, when the vehicle is driven by the engine, the revolution speed of the engine is determined through the vehicle speed if the vehicle is driven in a state of holding, at a first converter drive position, power from the engine. Therefore, since the engine produces only output directly proportional to the revolution speed, it cannot generate sufficient output in accordance with the state of the vehicle run. Accordingly, in the case of traveling at low vehicle speed under the condition of taking heavy loads of the vehicle run such as uphill travel or the like, due to low revolution speed of the engine, the engine cannot produce its output sufficiently and a smooth run by the engine becomes difficult.

An object of the present invention is to achieve miniaturization of a driving apparatus for an electric vehicle without enlarging a motor and, at the same time, improve its driving performance demonstrated at the time of traveling by an engine drive.

A driving apparatus for an electric vehicle according to the present invention includes an electric generator driven by an engine and a motor for driving driving-wheels by using electric power from said electric generator, the driving apparatus comprising: an engine-side input axle linked to a crankshaft of said engine and driven by said engine; a motor-side input axle linked to a motor rotor of said motor and driven by said motor; an output axle linked to said engine-side input axle and said motor-side input axle and transmitting power to said driving-wheels; and a transmission provided in an engine-power transfer channel formed by said engine-side input axle and said output axle, and shifting a revolution speed of said engine-power transfer channel to a plurality of shift ranges.

In the driving apparatus for an electric vehicle according to the present invention, said transmission is a discontinuously variable transmission having at least two ranges of a high speed range and a low speed range. Further, said transmission is a continuously variable transmission whose a gear ratio is continuously shiftable.

In the driving apparatus for an electric vehicle according to the present invention, said transmission is provided with a clutch shifting to a power transmission state of transmitting engine power to said driving-wheels and a power cutoff state of not transmitting. Further, a clutch, shifting to a power transmission state of transmitting engine power to said driving-wheels and a power cutoff state of not transmitting, is provided on said engine-side input axle so as to be separated from said transmission. Additionally, a clutch, shifting to a power transmission state of transmitting engine power to said driving-wheels and a power cutoff state of not transmitting, is provided on said output axle so as to be separated from said transmission. Furthermore, a clutch, shifting to a power transmission state of transmitting engine power to said driving-wheels and a power cutoff state of not transmitting, is provided between said output axle and a power transmission member linking said engine-side input axle and said output axle.

In the driving apparatus for an electric vehicle according to the present invention, a power-generating rotor of said electric generator is attached to said crankshaft, and said power-generating rotor is directly driven by said crankshaft. Further, a power-generating rotor of said electric generator is arranged parallel to said crankshaft, and said power-generating rotor is indirectly driven through an electric-power-generating power transmission member by said crankshaft.

In the driving apparatus for an electric vehicle according to the present invention, said motor-side input axle is coaxially arranged on said engine-side input axle, and said engine-side input axle and said output axle are linked through a power transmission member. Further, said motor-side input axle is coaxially arranged on said output axle, and said engine-side input axle and said output axle are linked through a power transmission member.

In the driving apparatus for an electric vehicle according to the present invention, said engine-side input axle and said motor-side input axle are provided parallel to said output axle, and said engine-side input axle and said output axle are linked through a first power transmission member, and said motor-side input axle and said output axle are linked through a second power transmission member. Further, said engine-side input axle, said motor-side input axle, and said output axle are disposed parallel to one another, and said engine-side input axle and said motor-side input axle are linked to said output axle through a power transmission member.

The driving apparatus for an electric vehicle according to the present invention further comprises: a velocity detecting means for detecting a traveling speed of the vehicle; and a clutch controlling means for setting said engine-power transfer channel to a power transmission state when the traveling speed of the vehicle exceeds a predetermined traveling speed.

The driving apparatus for an electric vehicle according to the present invention comprises: a load detecting means for detecting a traveling load of the vehicle; and a clutch controlling means for setting said engine-power transfer channel to a power transmission state when the traveling load of the vehicle exceeds a predetermined load, and further comprises a shift controlling means for changing a gear ratio of said transmission based on the traveling load of the vehicle when said engine-power transfer channel is in a power transmission state. Additionally, the driving apparatus comprises a motor controlling means for controlling power of said motor based on said traveling speed or a traveling load.

In the driving apparatus for an electric vehicle according to the present invention, the transmission for changing the revolution speed of the engine-power transfer channel to the plurality of shift ranges is provided to the engine-power transfer channel, so that, by changing the gear ratio when the vehicle travels with a low speed and heavy load, an engine output can be enhanced to drive the vehicle. The clutch for shifting the power transmission state of transmitting the engine power to the driving-wheels and the power cutoff state of not transmitting is provided to the engine-power transfer channel, so that the engine power and the motor power can be selectively transmitted to the output axle and power required for the motor is suppressed, whereby the driving apparatus can be miniaturized.

DESCRIPTION OF THE DRAWINGS

FIG. 11A is a skeleton view showing a driving apparatus according to another embodiment of the present invention.

FIG. 11B is a skeleton view showing a driving apparatus according to another embodiment of the present invention.

FIG. 11C is a skeleton view showing a driving apparatus according to another embodiment of the present invention.

FIG. 11D is a skeleton view showing a driving apparatus according to another embodiment of the present invention.

FIG. 11E is a skeleton view showing a driving apparatus according to another embodiment of the present invention.

FIG. 11F is a skeleton view showing a driving apparatus according to another embodiment of the present invention.

DESCRIPTION OF THE PREFERRED EMBODIMENTS

Figure 1:
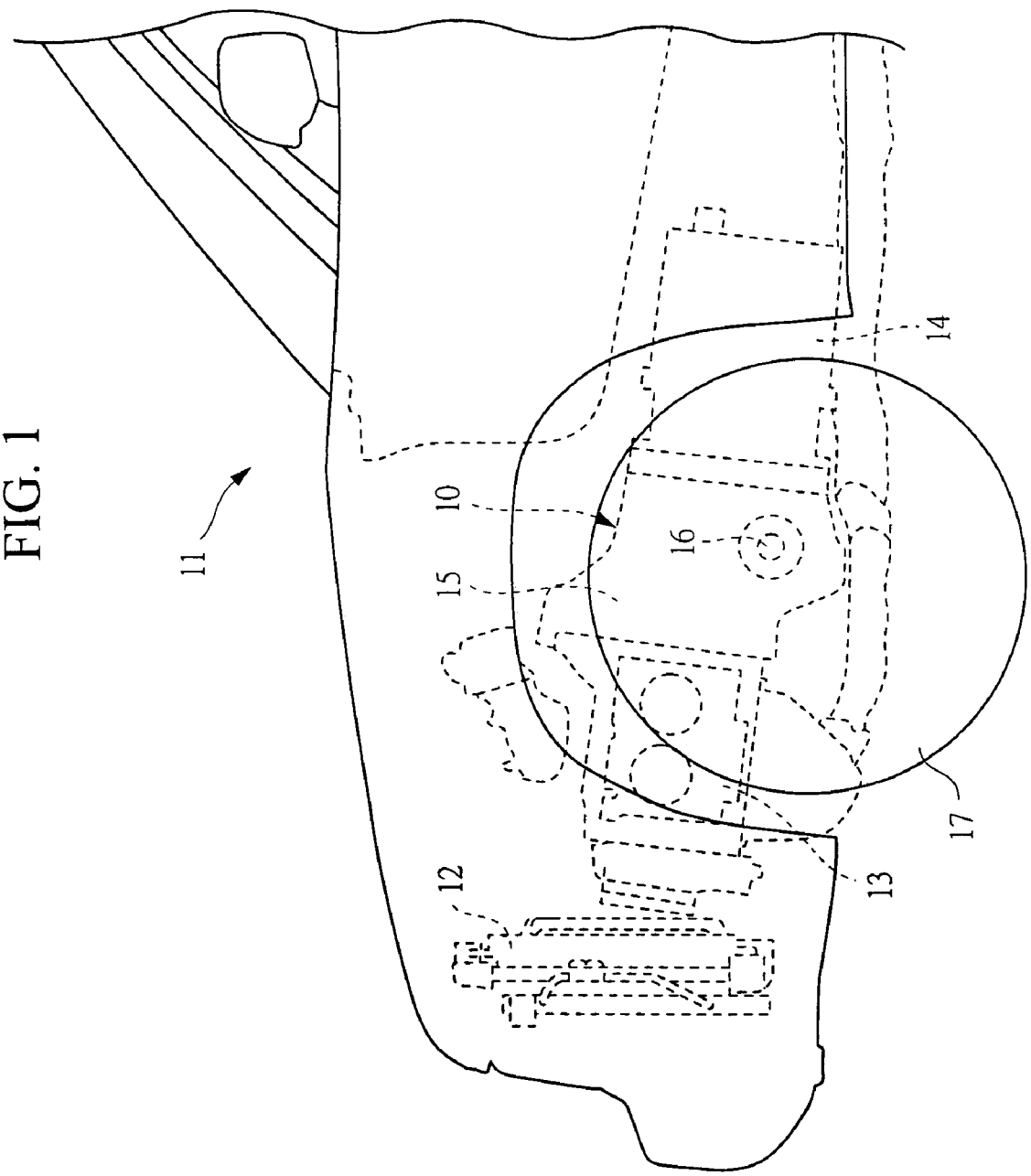
FIG. 1 is a schematic view showing a position of mounting, on a vehicle, a driving apparatus for an electric vehicle according to an embodiment of the present invention.

Embodiments of the present invention will be below detailed based on the drawings. As shown in FIG. 1, a driving apparatus 10 is parallel mount on a front end of an electric vehicle, namely, a hybrid vehicle 11, and accessories such as a radiator 12 and the like are provided in front of the driving apparatus 10. A front end of the driving apparatus 10 is provided with an engine 13, and a rear end thereof is provided with a motor 14, and a power transmission section 15 is provided between the engine 13 and the motor 14. A front-wheel-drive axle 16 protruding from the power transmission section 15 in a wide direction of the vehicle is linked to front wheels, namely, driving-wheels 17, and the driving apparatus 10 is applied to the hybrid vehicle 11 of a front-wheel-drive type.

Figure 2:
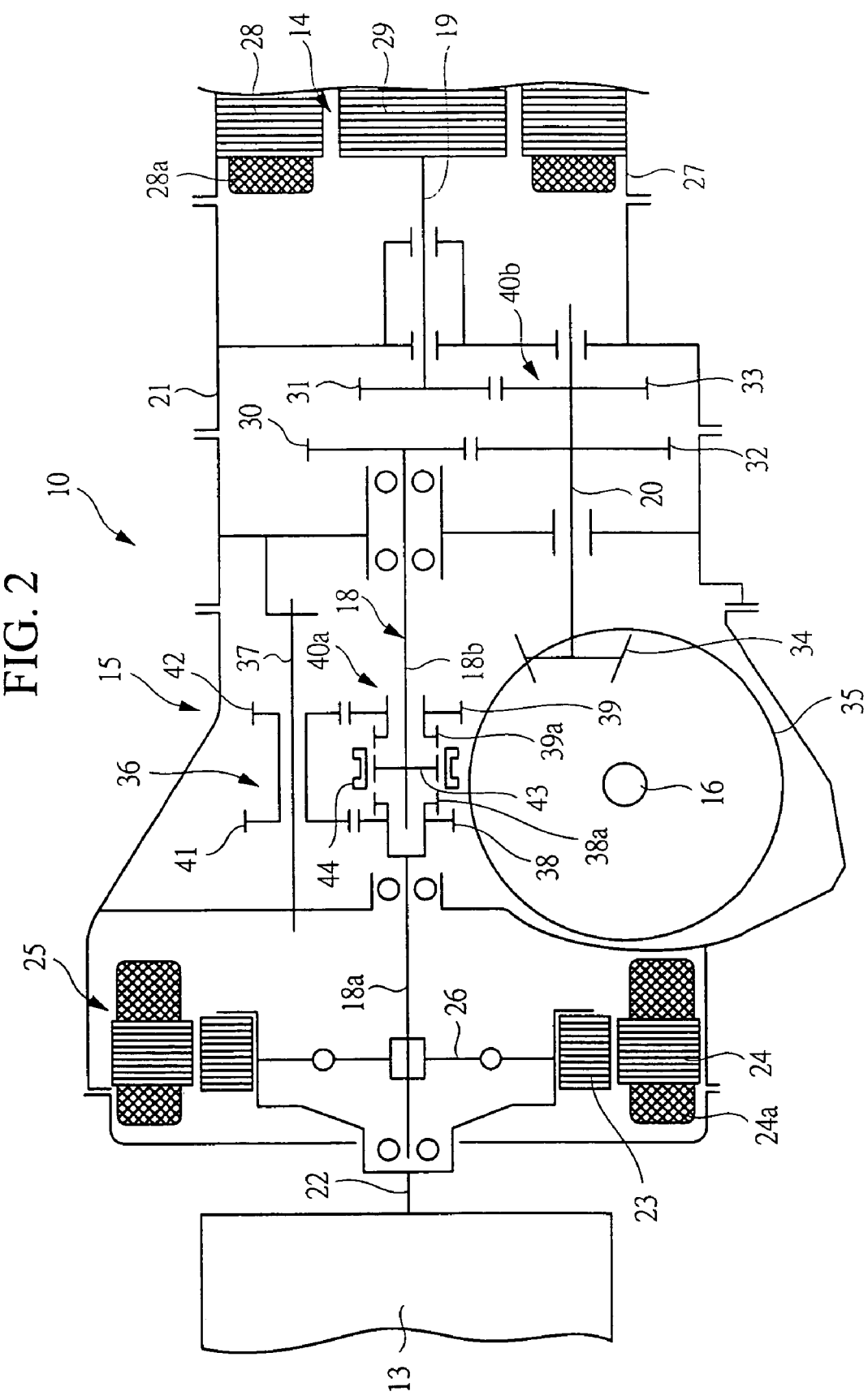
FIG. 2 is a skeleton view showing a driving apparatus according to an embodiment of the present invention.
Figure 3:
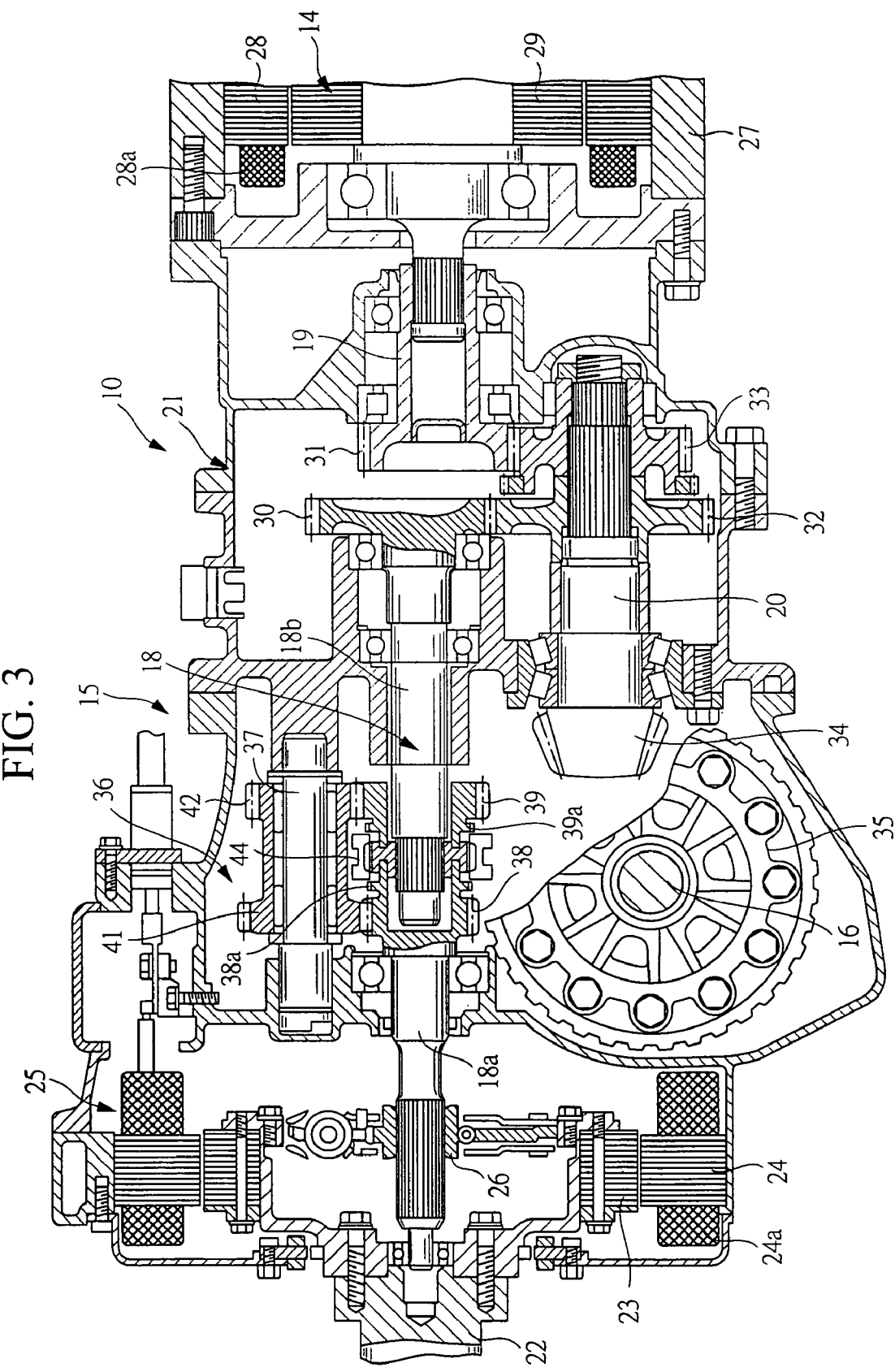
FIG. 3 is a cross-sectional view of the driving apparatus shown in FIG. 2.

As shown in FIGS. 2 and 3, the power transmission section 15 comprises: an engine-side input axle 18 driven by the engine 13; a motor-side input axle 19 driven by the motor 14; and an output axle 20 linked to the front wheels, namely, the driving-wheels 17 in parallel to these axles 18 and 19 to transmit power thereto. The engine-side input axle 18, motor-side input axle 19, and output axle 20 are rotatably housed in a gear case 21 toward an advancing direction of the vehicle. The gear case 21 is constituted by a plurality of case bodies, and the gear case 21 is assembled by fixing the plurality of case bodies through bolts.

A cylindrical power-generating rotor 23 is linked to a crankshaft 22 of the engine 13, and a stator 24 disposed so as to surround the power-generating rotor 23 is fixed to the gear case 21, and a stator coil 24a is wound around the stator 24. The power-generating rotor 23 and the stator 24 constitute a generator, namely, an electric generator 25. The power-generating rotor 23 is directly driven by the crankshaft 22, that is, driven without interposing power transmission members such as gears and belts, etc., thereby allowing efficient electric power to be generated without causing power transmission losses. A damper 26 for attenuating engine power of the crankshaft 22 and transmitting the attenuated power to the engine-side input axle 18 is incorporated in an accommodating space formed inside the power-generating rotor 23. The engine 13 drives the power-generating rotor 23 and the engine-side input axle 18.

The motor 14 is incorporated in a motor case 27 linked to the gear case 21, and includes a cylindrical stator 28 fixed to the motor case 27 and a motor rotor 29 rotatably incorporated inside the stator 28, wherein a stator coil 28a is wound around the stator 28. The motor 14 is constituted by the stator 28 and the motor rotor 29. The motor rotor 29 is driven by supplying electric power to the stator coil 28. Further, the motor-side input axle 19 is linked to a tip of the motor rotor 29 protruding from the motor case 27, and the motor 14 drives the motor-side input axle 19.

The engine-side input axle 18 comprises: a first input axle 18a linked to the crankshaft 22 through the damper 26; and a second input axle 18b disposed concentrically thereto, wherein a engine-side driving gear 30 is provided on the second input axle 18b and a motor-side driving gear 31 is provided on the motor-side input axle 19. On the output axle 20, an engine-side driven gear 32 and a motor-side driven gear 33 are provided so as to be engaged with these driving gears 30 and 31. A gear train comprising the engine-side driving gear 30 and driven gear 32 forms a first power transmission member while a gear train comprising the motor-side driving gear 31 and driven gear 33 forms a second power transmission member.

A hypoid pinion gear 34, which is a final reduction drive gear, is provided on the output axle 20, and a hypoid gear 35, which is a final reduction driven gear as engaged therewith, is rotatably provided in the gear case 21. The hypoid gear 35 has a differential gear unit not shown, namely, a differential gear, whereby power transmitted to the output axle 20 from the engine-side input axle 18 and the motor-side input axle 19 is input to the hypoid gear 35 and, thereafter, is transmitted to the left and right front-wheel-drive axles 16 through the differential gear.

Thus, in the driving apparatus 10, a engine-power transfer channel 40a, transmitting the engine power to the driving-wheels 17, is formed by: the engine-side input axle 18 comprising the first and second input axles 18a and 18b; and the output axle 20 linked to the engine-side input axle through the gear train. A motor-power transfer channel 40b is formed by the motor-side input axle 19 and the output axle 20 linked to it through the gear train. Therefore, the power is transmitted to the driving-wheels 17 through either or both of the power transfer channels.

On the engine-side input axle 18 constituting the engine-power transfer channel 40a, a transmission 36 is provided to change the revolution speed of the engine-power transfer channel 40a at two stages by shifting the revolution speed of the first input axle 18a to that of the second input axle 18b. Therefore, the transmission 36 becomes parallel to the engine-side input axle 18 and includes a intermediate axle 37 provided in the gear case 21. There are rotatably mounted, on the intermediate axle 37, first and second intermediate gears 41 and 42 engaged respectively with a driving gear 38 fixed to the first input axle 18a and a driven gear 39 rotatably mounted on the second input axle 18b. These intermediate gears 41 and 42 are integrally rotated.

A changing hub 43 is spline-connected to the second input axle 18b, and a changing sleeve 44 is axially and slidably engaged with the changing hub 43. A clutch gear 38a, engaged with the changing sleeve 44, is provided to the diving gear 38 while a clutch gear 39a, engaged with the changing sleeve 44, is provided to the driven gear 39. Therefore, the changing sleeve 44 is automatically driven axially by a hydraulic type actuator not shown. A dog clutch type shift mechanism is formed by the changing sleeve 44, but a synchromesh type shift mechanism may be used.

When the changing sleeve 44 is engaged with the driving gear 38 through the clutch gear 38a, the first and second input axles 18a and 18b are directly connected to each other and the revolution speed of the second input axle 18b is equal to that of the crankshaft 22 to transmit the engine power to the driving-wheels 17 through the output axle 20. Meanwhile, when the changing sleeve 44 is engaged with the driven gear 39 through the clutch gear 39a, the first input axle 18a is linked to the second input gear 18b through a shift gear train comprising the driving gear 38, the driven gear 39, and the intermediate gears 41 and 42 and the revolution speed of the second input axle 18b becomes different from that of the first input gear 18a to transmit the engine power to the driving-wheels 17 through the output axle 20. The driving gear 38 has a diameter smaller than the driven gear 39 and, therefore, rotation of the crankshaft 22 is reduced when the engine power is transmitted to the driving-wheels 17 through the shift gear train. Accordingly, the transmission 36 has a gear ratio of a high speed rage when the first and second input axles 18a and 18b become a directly connected state, and the transmission 36 has a gear ratio of a low speed range when both input axles 18a and 18b are linked through the gear train.

The changing sleeve 44 moves at an intermediate position at which neither of the driving gear 38 and the driven gear 39 are connected to the changing sleeve, and the changing sleeve 44 functions as a clutch for shifting a power transmission state of transmitting the engine power to the output axle 20 and a power cutoff state of not transmitting it.

Figure 4:
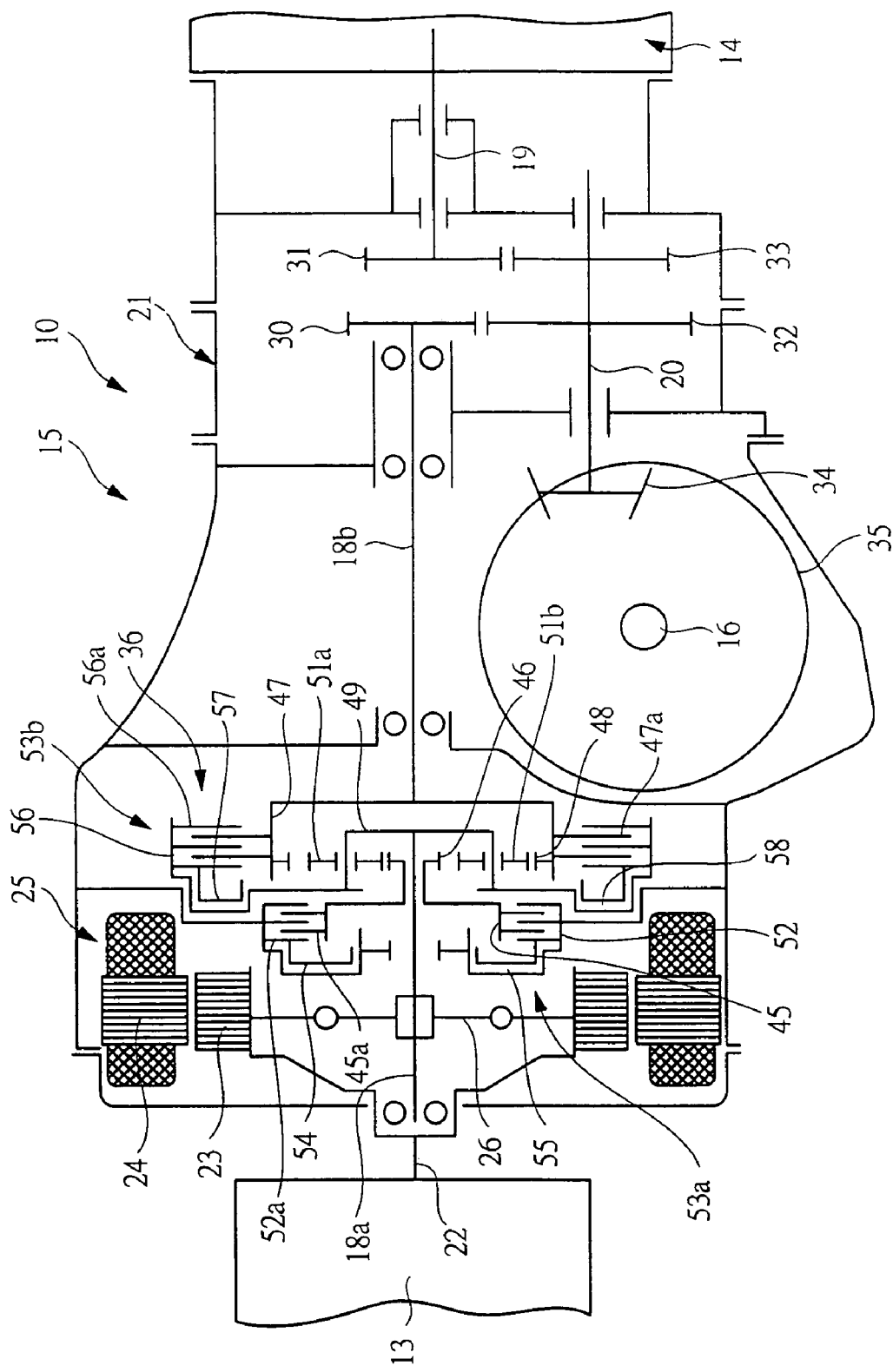
FIG. 4 is a skeleton view showing a driving apparatus according to another embodiment of the present invention.

FIG. 4 is a skeleton view showing a driving apparatus 10 according to another embodiment of the present invention. This driving apparatus 10 is different from the above-mentioned driving apparatus in a structure of the transmission 36, but is the same as it in other the structures. A transmission 36 shown in FIG. 4 is of a planet gear type. A sun gear 46 is attached to a clutch hub 45 rotatably mounted on the first input axle 18a, and a ring gear 48 is attached to a clutch hub 47 fixed to the second input axle 18b. A pinion gear 51a engaged with the sun gear 46, and a pinion gear 51b engaged with this pinion gear 51a and the ring gear 48 are rotatably mounted on a carrier 49 fixed to the first input axle 18a, respectively. The planet gear is of a double pinion type.

A clutch drum 52 is disposed outside the clutch hub 45, and the clutch drum 52 is fixed to the gear case 21. A plurality of clutch plates 52a are slidably mounted axially inside a radial direction of the clutch drum 52, and clutch plates 45a coming in contact with the clutch plates 52a are slidably mounted axially outside a radial direction of the clutch hub 45. Therefore, the clutch 53a is constituted by these clutch plates. An annular hydraulic piston 54 is mounted on the clutch drum 52, and a hydraulic chamber 55 is constituted by the hydraulic piston 54 and the clutch drum 52. When working fluid is supplied into the hydraulic chamber 55, the clutch plates 45a and 52a are operatively connected to one another and the clutch 53a becomes an operatively connected state, whereby the sun gear 46 becomes a fixed state. Meanwhile, when the connecting state of the clutch plates 45a and 52a is disconnected and the clutch 53a is made a release state, the sun gear 46 can be rotated.

The clutch drum 56 is disposed outside the clutch hub 47, and the clutch drum 56 is attached to the carrier 49. A plurality of clutch plates 56a are slidably mounted axially inside a radius direction of the clutch drum 56 while clutch plates 47a coming in contact with the clutch plates 56a are slidably mounted axially outside a radius direction of the clutch hub 47. Therefore, the clutch 53b is constituted by these clutch plates. A cylindrical hydraulic piston 57 is mounted on the clutch drum 56, and a hydraulic chamber 58 is formed by the hydraulic piston 57 and the clutch drum 56. When working fluid is supplied into the hydraulic chamber 58, the clutch plates 47a and 56a are operatively connected to one another and the clutch 53b becomes an operatively connected state, whereby the carrier 49 and the ring gear 48 are operatively connected to each other. Meanwhile, when the operatively connected state of the clutch plates 47a and 56a is disconnected and the clutch 53b is made a release state, the carrier 49 and the ring gear 48 become relatively rotatable.

In the transmission 36 shown in FIG. 4, when the clutch 53a is set in a release state and the clutch 53b is set in an operatively connected state, the first input axle 18a and the second input axle 18b become a directly connected state through the carrier 49 and the clutch hub 47 operatively connected thereto. Therefore, the revolution speed of the second input axle 18b is equal to that of the crankshaft 22, whereby the engine power is transmitted to the driving-wheels 17 through the output axle 20. Meanwhile, when the clutch 53a is set in an operatively connected state and the clutch 53b is set in a release state, the rotation of the first input axle 18a is transmitted to the second input axle 18b through the pinion gears 51a and 51b and the ring gear 48. Therefore, the revolution speed of the second input axle 18b becomes slower than that of the crankshaft 22 and is transmitted to the output axle 20. Accordingly, when the first and second input axle 18a and 18b become a directly connected state, the transmission 36 obtains a gear ratio of a high speed range. When the clutch 53a is operatively connected, the rotation of the first input axle 18a is reduced through the pinion gears 51a and 51b and is transmitted to the second input axle 18b and the transmission 36 obtains a gear ratio of a low speed range.

Additionally, when both of the two clutches 53a and 53b are set in release states, the first input axle 18a and the second input-axle 18b become cutoff states and the engine power is not transmitted to the output axle 20, whereby these clutch 53a and 53b each function as a clutch for shifting a power transmission state of transmitting the engine power to the driving-wheels 17 through the output axle 20 and a power cutoff state of not transmitting it.

Figure 5:
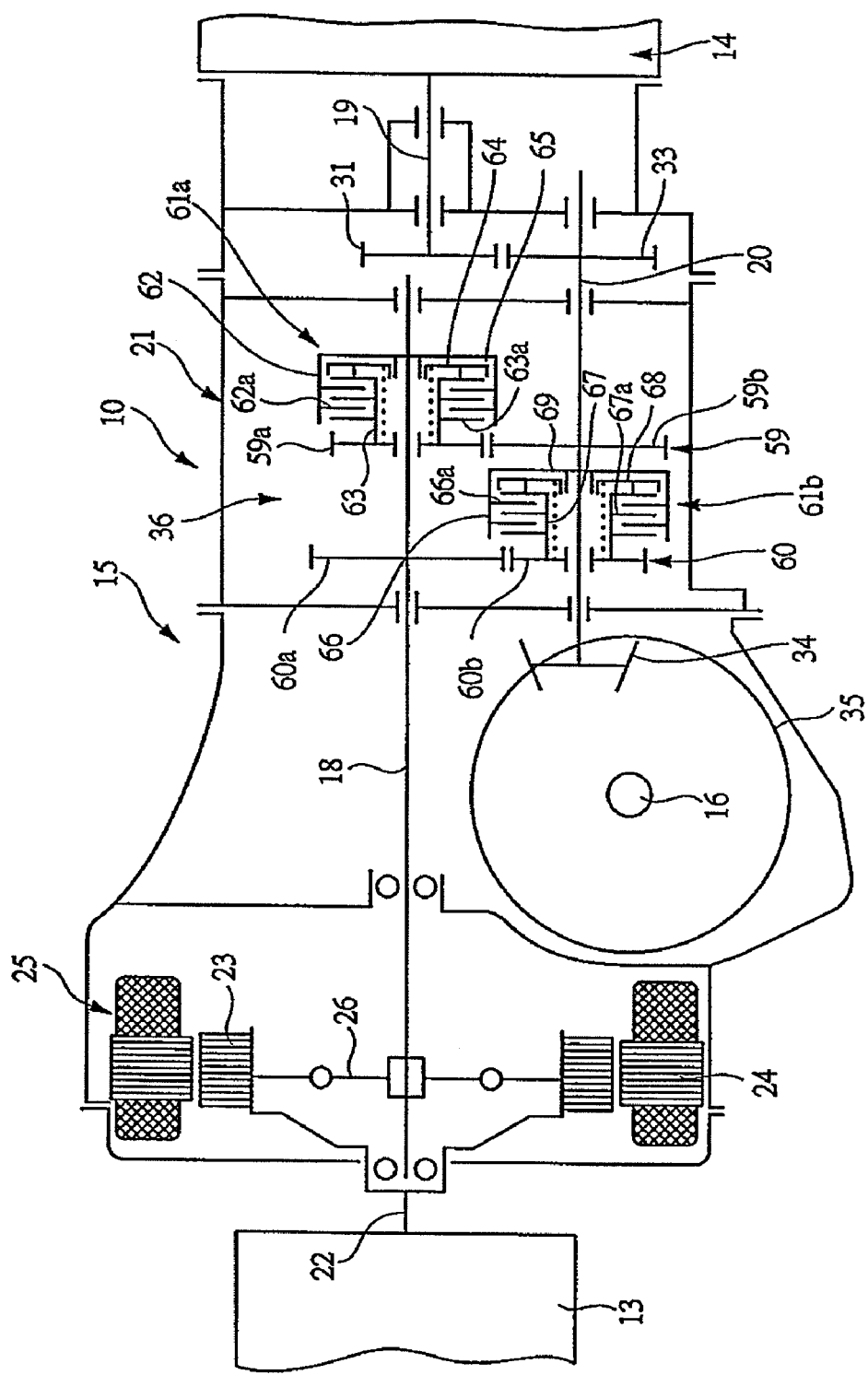
FIG. 5 is a skeleton view showing a driving apparatus according to still another embodiment of the present invention.

FIG. 5 is a skeleton view showing a driving apparatus 10 according to another embodiment of the present invention. In this driving apparatus 10, the transmission 36 is different from that of the above-mentioned driving apparatus in structure and the engine-side input axle 18 is formed by an integrally rotating shaft, but the other structures except the transmission and the engine-side input axle are the same. The transmission 36 shown in FIG. 5 is formed by a shift gear train provided with a clutch, which shifts to the respective power transmission state and power cutoff state. A first driving gear 59a is rotatably mounted on the engine-side input axle 18 and a second driving gear 60a is fixed to the engine-side input axle 18. A driven gear 59b, forming a shift gear train 59 by being always engaged with the driving gear 59a, is fixed to the output axle 20, and a driven gear 60b, forming a shift gear train 60 by being always engaged with the driving gear 60a, is rotatably mounted on the output axle 20.

The engine-side input axle 18 is provided with a clutch 61a for shifting the shift gear train 59 to the power transmission state or power cutoff state, and the output axle 20 is provided with a clutch 61b for shifting the shift gear train 60 to the power transmission state or power cutoff state. The clutch 61a has a clutch drum 62 fixed to the engine-side input axle 18, and a clutch hub 63 fixed to the driving gear 59a. A plurality of clutch plates 62a are slidably mounted axially inside a radical direction of the clutch drum 62, and clutch plates 63a coming respectively in contact with the clutch plates 62a are slidably mounted axially outside a radical direction of the clutch hub 63. An annular hydraulic piston 64 is mounted on the clutch drum 62, whereby a hydraulic chamber 65 is constituted by the hydraulic piston 64 and the clutch drum 62. When working fluid is supplied into the hydraulic chamber 65, the clutch plates 62a and 63a come in close contact with one another and the clutch 61a becomes an operatively connected state. Therefore, the driving gear 59a is operatively connected to the engine-side input axle 18 and the shift gear train 59 becomes the power transmission state.

The clutch 61b has a clutch drum 66 fixed to the output axle 20, and a clutch hub 67 fixed to the driven gear 60b. Similarly to the clutch 61a, clutch plates 66a and 67a are respectively mounted and, at the same time, an annular hydraulic piston 68 is mounted on the clutch drum 66. When the working fluid is supplied into a hydraulic chamber 69 constituted by the hydraulic piston 68 and the clutch drum 66, the clutch plates 66a and 67a are operatively connected to one another and the clutch 61b becomes an operatively connected state. Therefore, the driving gear 60a is operatively connected to the output axle 20 and the shift gear train 60 becomes the power transmission state.

The driving gear 59a has a radius smaller than that of the driving gear 60a. When the clutch 61a becomes the operatively connected state and the shift gear train 59 becomes the power transmission state, the transmission 36 has a gear ratio of a low speed range. When the clutch 61b becomes the operatively connected state and the shift gear train 60 becomes the power transmission state, the transmission has a gear ratio of a high speed range. Further, both clutches 61a and 61b are released, the transmission of the engine power to the output axle 20 is blocked.

Each of the transmissions 36 shown in FIGS. 2 to 5 is a discontinuously variable transmission having a two-step shift range comprising a high speed range and a low speed range. However, the step number of the shift range is not limited to two steps and the above-mentioned transmission may have a three or more-step shift range.

Figure 6:
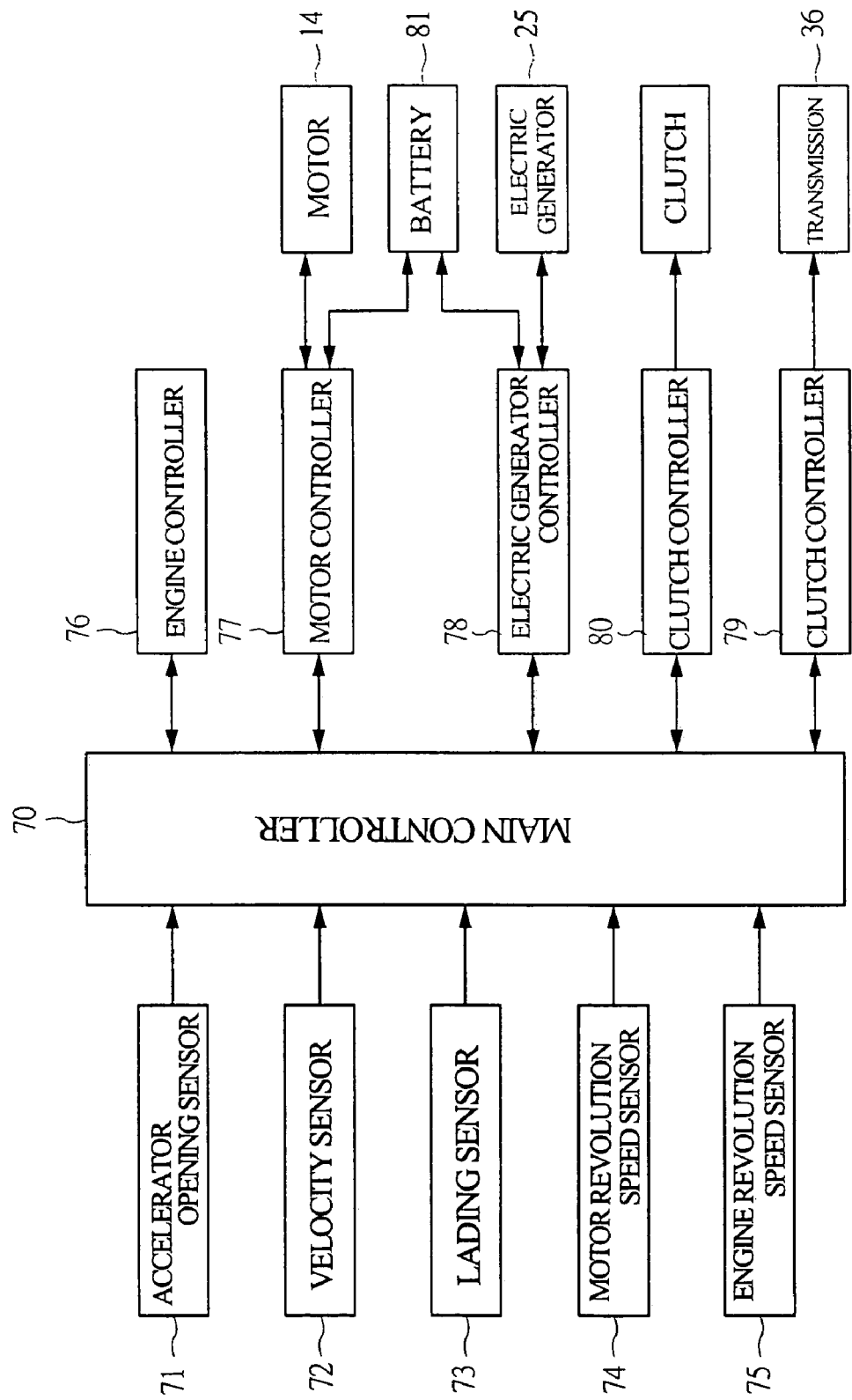
FIG. 6 is a block view showing a control circuit for controlling an operation of the driving apparatus.

FIG. 6 is a block view showing a control circuit for controlling an operation of the above-mentioned driving apparatus 10, wherein there are transmitted, to a main controller 70, detection singles from: an accelerator opening sensor 71 for detecting an opening angle of an accelerator pedal; a velocity sensor 72 as a velocity detecting means for detecting a traveling speed of a vehicle; a loading sensor 73 comprising a throttle opening sensor or the like as a load detecting means for detecting traveling loads of the vehicle; a motor revolution-speed sensor 74 for detecting revolution speed of the motor rotor 29; and an engine revolution-speed sensor 75 for detecting revolution speed of the crackshaft 22. Respective control signals output from the main controller 70 are transmitted to: an engine controller 76 for controlling an operation of the engine 13; a motor controller 77 as a motor controlling means for controlling an operation of the motor 14; an electric generator controller 78 for controlling an operation of the electric generator 25; a transmission controller 79 as a shift controlling means for controlling a shift of the shift ranges by the transmission 36; and a clutch controller 80 as a clutch controlling means for controlling a shift of the clutch incorporated in the transmission 36.

A battery 81 is connected to the motor controller 77 and the electric generator controller 78. If the vehicle is driven by the motor 14, electric power from the battery 81 is supplied to a stator coil 28*a* of the motor 14. Meanwhile, a charge of the battery 81 is performed by working the electric generator 25, but the motor 14 may charge the battery 81 by using an function of the motor 14 as an electric generator at the braking thereof.

In the driving apparatus 10 shown in FIG. 2, the changing sleeve 44 is driven by the hydraulic actuator to achieve the shifting of the shift range and the blocking of power, so that the operation of the hydraulic actuator is controlled by a signal from the transmission controller 79 and the changing sleeve 44 is driven. Meanwhile, in each driving apparatus shown in FIGS. 4 and 5, the shifting of the shift range and the blocking of the power are achieved by controlling hydraulic pressure supplied to the hydraulic chamber of the clutch, so that the signal from the clutch controller 80 controls the hydraulic pressure supplied to the hydraulic chamber. When the blocking of power transmission, that is, the transmission and the blocking of the engine power are made by the clutch separated from the transmission 36 and when only the controlling of the gear ratio is made by the transmission 36, the transmission is controlled by the transmission controller 79 and the clutch is controlled by the clutch controller 80.

Figure 7:
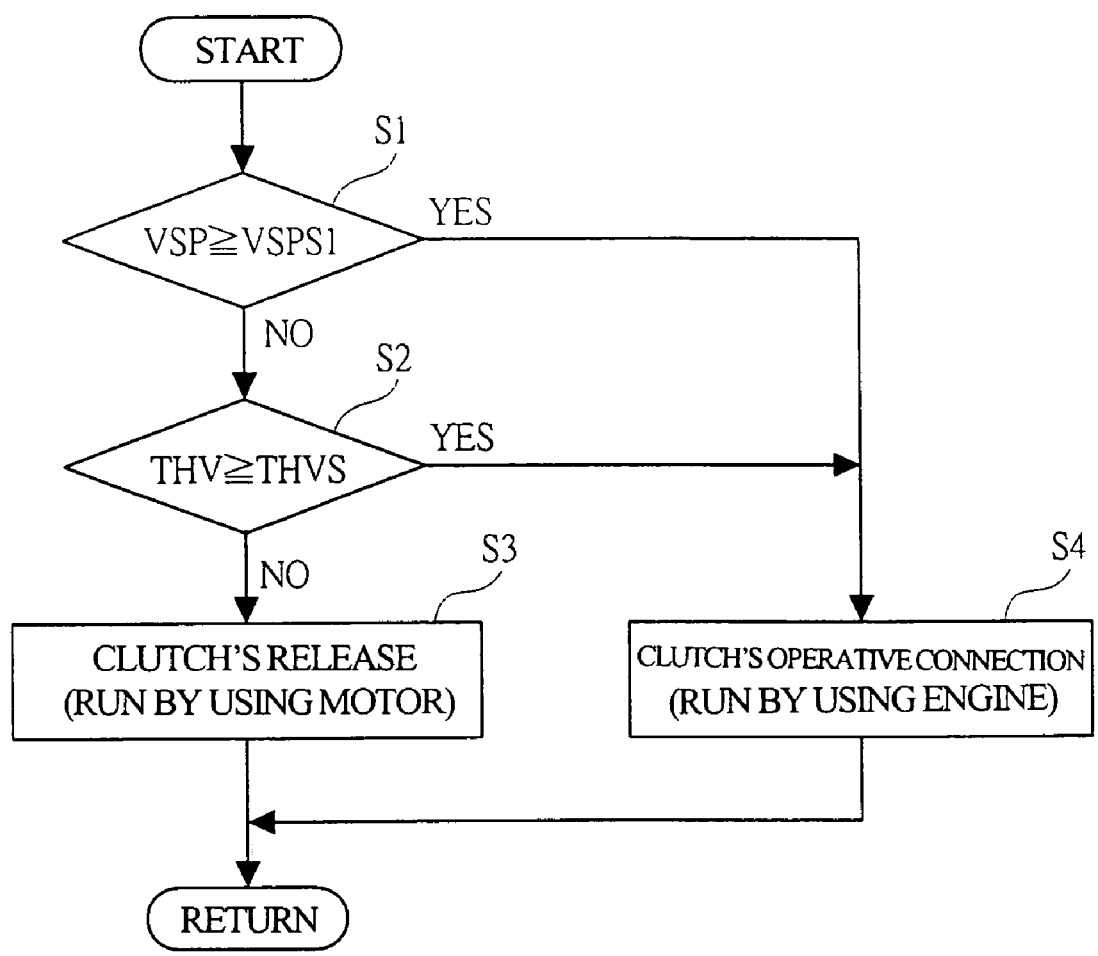
FIG. 7 is a flow chart showing a shift controlling procedure, which controls a clutch for shifting engine power to a power transmission state or power cutoff state with respect to driving-wheels.
Figure 8:
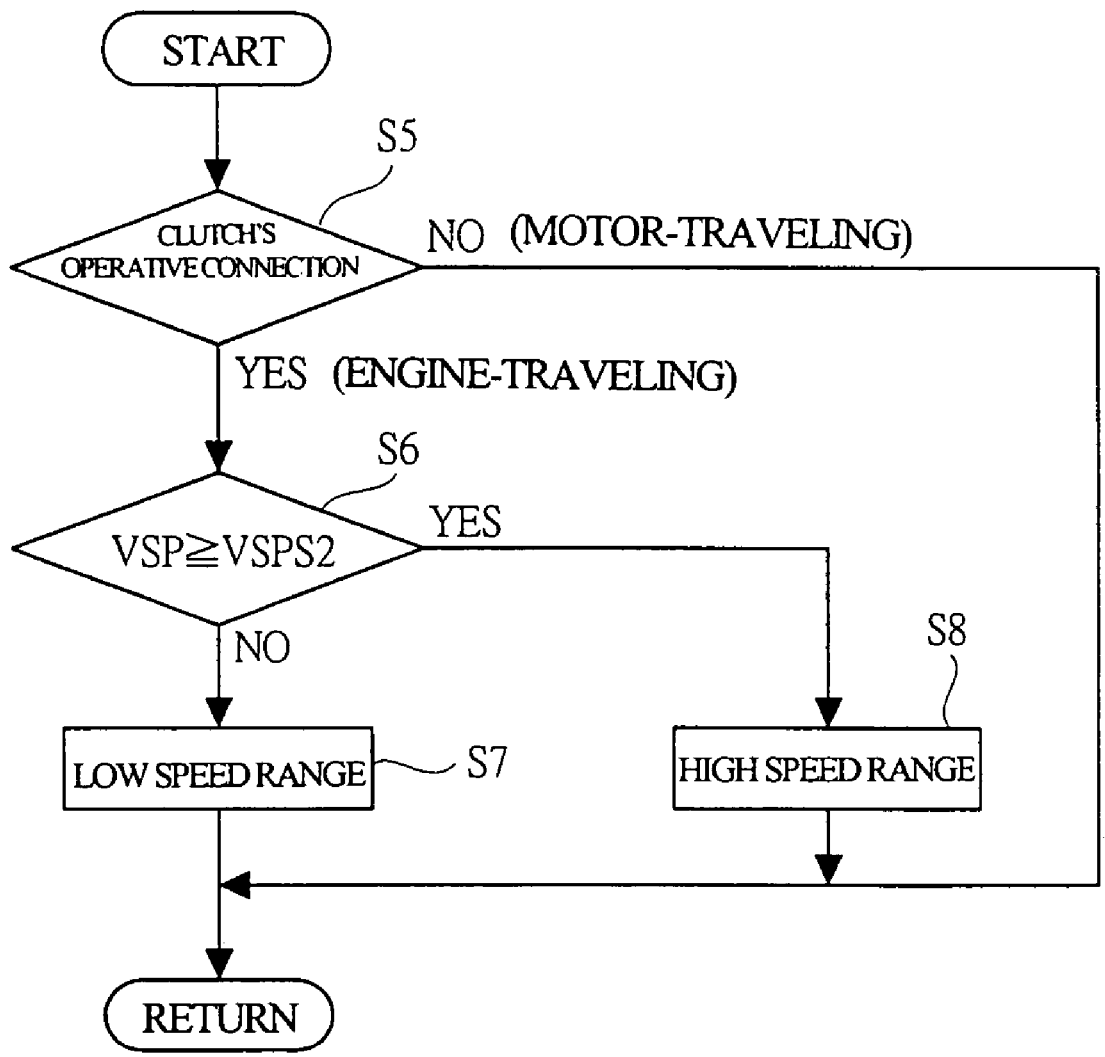
FIG. 8 is a flow chart showing a shift controlling procedure for shift ranges of a transmission.

FIG. 7 is a flow chart showing a shift controlling procedure for controlling a clutch for shifting engine power to a power transmission state or power cutoff state with respect to driving-wheels, and FIG. 8 is a flow chart showing a shift controlling procedure for shift ranges of a transmission. Each process is performed per predetermined time, for example, per 10 msec.

In step S1, a traveling speed VSP detected by the velocity sensor 72 and a determination threshold VSPS1 (for example, 80 km/h) stored in a memory in the main controller 70 are compared. If it is determined that the traveling speed VSP does not reach the determination threshold VSPS1, step S2 determines a throttle opening angle THV as an example of a load. In the step S2, the throttle opening angle THV detected by the loading sensor (the throttle opening angle sensor) 73 and a determination threshold THVS (for example, 30 degrees) stored in the memory are compared. If it is determined that the throttle opening angle THV does not reach the determination threshold THVS, step S3 is performed. When the step S3 is performed, the clutch is released and the transmission of the engine power to the output axle 20 is blocked, whereby the vehicle is driven by the motor 14.

Meanwhile, when it is determined in the step S1 that the traveling speed is higher than the determination threshold VSPS1 or in the step S2 that the throttle opening angle is larger than the determination threshold and the vehicle is driven with heavy loads, step S4 is performed and the clutch becomes the operatively connected state, whereby the vehicle is driven by the engine power.

Note that, in the present embodiment, a load state is determined by the throttle opening angle, but, as well known, there may be appropriately adopted an accelerator opening angle, an intake of air into the engine, a fuel-injection pulse width determining an amount of fuel injected through a fuel-injection valve of the engine or a basic fuel-injection pulse width determining a basic amount of fuel injected, an intake of air per stroke of the engine, and an intake of air per turn of the engine, etc. in order to determine the load state instead of the throttle opening angle.

In step S5 shown in FIG. 8, it is determined whether or not the clutch is operatively connected, that is, whether the clutch is operatively connected to engine-travel the vehicle or whether the clutch is released to motor-travel the vehicle. If it is determined that the vehicle is engine-traveled, the traveling speed VSP detected by the velocity sensor 72 and a determination threshold VSPS2 (for example, 50 km/h) stored in the memory are compared in step S6. If it is determined that the traveling speed VSP does not reach the determination threshold VSPS2, the transmission 36 is shifted to a low speed rage in step S7. When the traveling speed exceeds the determination threshold VSPS2, the transmission 36 is shifted to a high speed range in step S8.

Figure 9A:
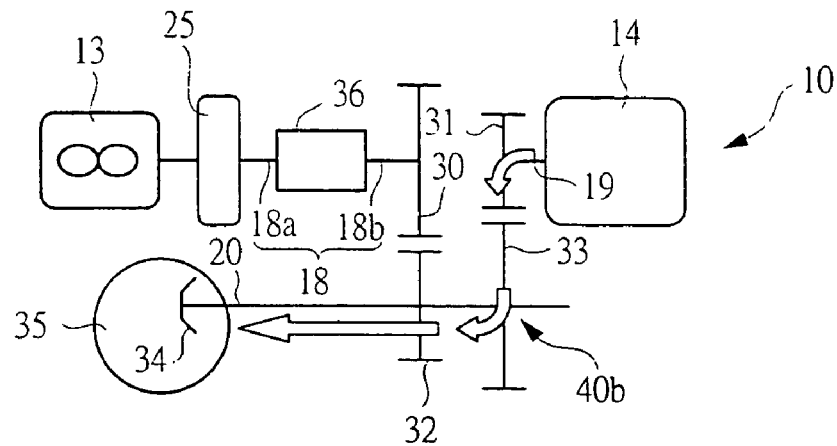
FIG. 9A is a skeleton view showing a transfer channel of power in a traveling state.
Figure 9B:
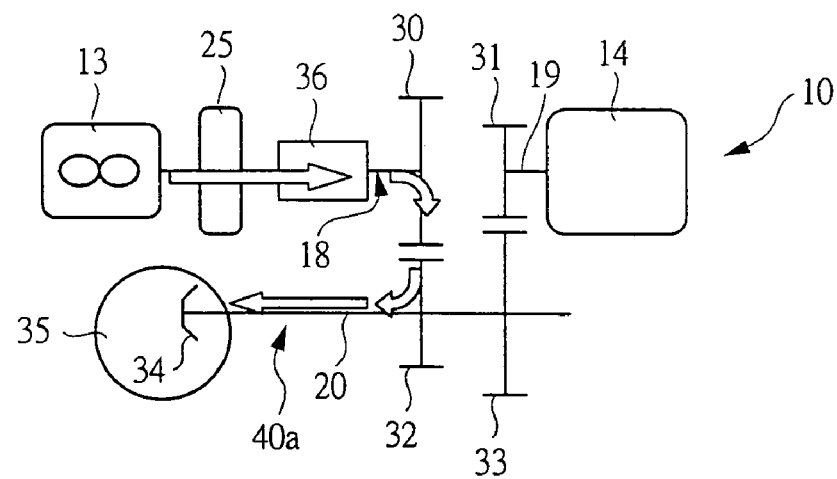
FIG. 9B is a skeleton view showing a transfer channel of power in a traveling state.
Figure 9C:
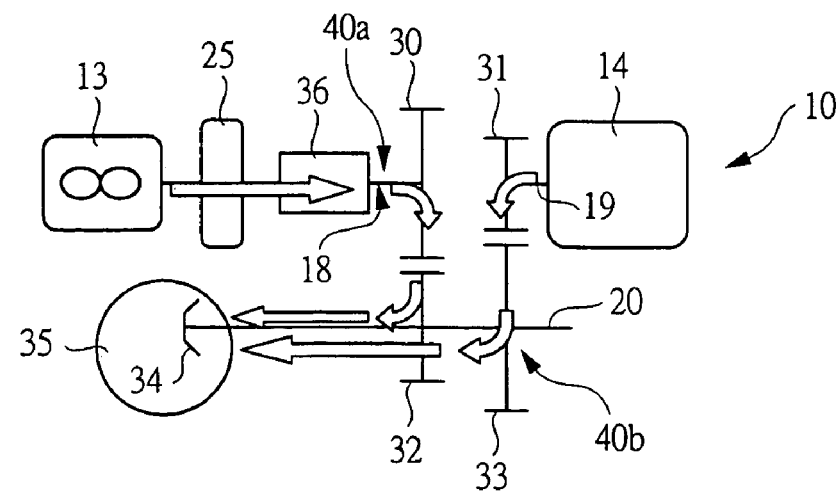
FIG. 9C is a skeleton view showing a transfer channel of power in a traveling state.

FIG. 9 is a skeleton view showing a transfer channel of the power in the above-mentioned driving apparatus 10. FIG. 9A shows the transfer channel of the power at the time of a low-speed and low-load run in which the traveling speed is equal to or less than the predetermined value VSPS1 and the throttle opening angle is equal to or less than the predetermined value THVS. At this time, the clutch incorporated in the transmission 36 is shifted to a power cutoff state and the motor power is transmitted to the driving-wheels 17 through a motor-power transfer channel 40*b*. Therefore, at the time of the traveling under this condition, the engine 13 can be driven with good efficient revolution speed, and the battery 81 is charged through the electric generator 25 driven by the engine 13 and, at the same time, the electric power is supplied to the motor 14 from the battery 81.

FIG. 9B shows a transfer channel of power at the time of a high speed run or a heavy load run in which the traveling speed is equal to or more than a predetermined traveling speed. At this time, the clutch incorporated in the transmission 36 is shifted to the power transmission state and the driving-wheels 17 are driven through the engine-power transfer channel 40*a* by using the engine 13 as a power source. At the time of the traveling under this condition, the supplying of the power to the motor 14 is blocked, whereby the traveling, which uses only the engine 13 as a power source, is made. At the time of the heavy-load run, which uses the engine as a power source and in which the throttle opening angle is equal to or more than a predetermined value, the shift range of the transmission 36 is shifted to either of a low speed range and a high speed range depending on the traveling speed. Therefore, when the vehicle with an about 40 km/h low speed travels an uphill road, the revolution speed of the engine is increased by shifting the shift range to a low speed range and a large engine output is transmitted to the driving-wheels 17 so as to travel by only the engine power, whereby the driving performance of the vehicle can be improved.

FIG. 9(*c*) shows a state of driving the motor 14 plus the engine 13 to transmit the engine power and the motor power to the output axle 20. In the traveling conditions where large drive torque is required, such as a rapid acceleration or uphill road run, the engine power and the motor power are transmitted to the driving-wheels 17 through the engine-power transfer channel 40*a* and the motor-power transfer channel 40*b*. Therefore, in the traveling condition where the engine 13 takes the heavy load, since the motor power assisting the drive torque is also transmitted to the output axle 20, an output required for the engine 13 can be set to become small without reducing the driving performance of the vehicle, whereby the engine 13 can be miniaturized. Further, since the power source for driving the vehicle can be appropriately sifted depending on the traveling conditions, energy efficiency of the entire of the system of the driving apparatus 10 can be improved.

Note that the control of the clutch incorporated in the transmission 36 is similarly made also in shifting a high speed run to a low speed run. At this time, the traveling speed set in shifting the clutch to the power cutoff state is set to be smaller than that set in shifting the clutch to the power transmission state and, therefore, it is possible to prevent an occurrence of a hunting phenomenon in which the motor power and the engine power are frequently shifted in traveling at the nearly set traveling speed.

Figure 10:
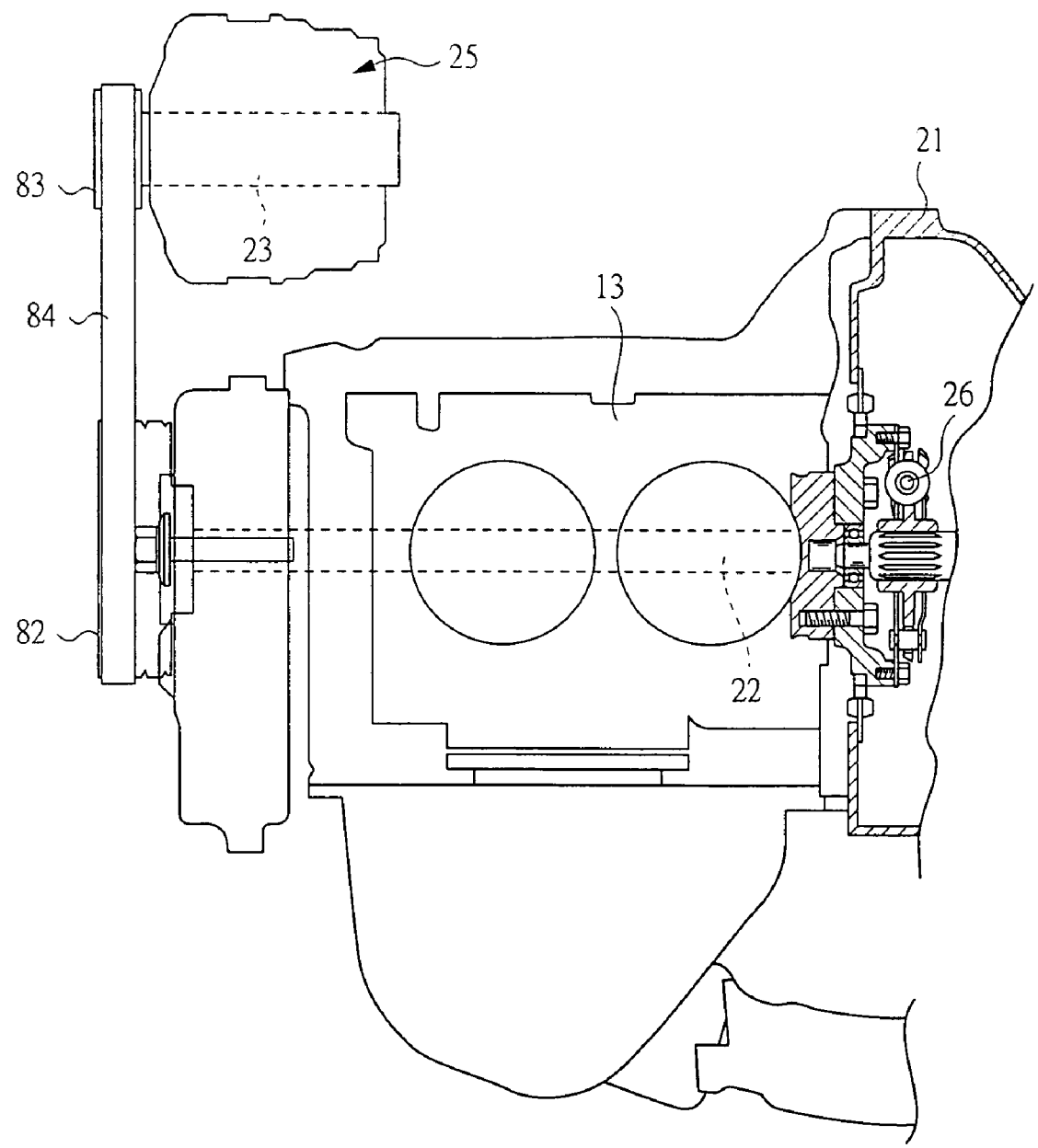
FIG. 10 is a cross-sectional view showing partially a driving apparatus according to sill another embodiment of the present invention.

FIG. 10 is a cross-sectional view partially showing a driving apparatus 10 according to another embodiment of the present invention. As shown in FIG. 10, the electric generator 25 driven by the engine 13 is disposed parallel to the crankshaft 22 and above the engine 13. A driving pulley 82 linked to the crankshaft 22 is provided in front of the engine 13, and a driven pulley 83 fixed to the power-generating rotor 23 is provided above the driving pulley 82. An electric-power-generating power transmission member, that is, a driving belt 84 is bridged between the driving pulley 82 and the driven pulley 83, and the crankshaft 22 of the engine 13 indirectly drives the electric generator 25 through the driving belt 84.

In this case, it is possible to dispose the electric generator 25 outside the gear case 21 and to shorten longitudinally the gear case 21 up to a dimension of the electric generator 25, whereby miniaturization of the driving apparatus 10 and improvement in further mounting characteristics can be achieved. As the electric-power-generating power transmission member, a driving chain may be used instead of the driving belt 84. In that case, a driving sprocket is mounted on the crankshaft 22 instead of the driving pulley 82 and a driven sprocket is mounted on the power-generating rotor 23 instead of the driven pulley 83. Further, as the electric-power-generating power transmission member, the electric generator 25 may be driven by providing the driving gear and the driven gear. Note that the transmission in FIG. 10 is omitted and the transmissions 36 shown in the FIGS. 2 to 5 can be employed respectively as the omitted transmission.

FIGS. 11A to 11F each is a skeleton view showing the driving apparatus 10 according to another embodiment of the present invention. In the driving apparatus 10 shown in FIG. 11A, the motor-side input axle 19 is linked axially to the output axle 20. Thus, by connecting directly the motor-side input axle 19 to the output axle 20, it is possible to eliminate the motor-side driving gear 31 and the motor-side driven gear 33, which link the motor-side input axle 19 and the output axle 20 and are shown in FIG. 2.

In the driving apparatus shown in FIG. 11B, the motor-side input axle 19 is linked axially to the engine-side input axle 18. Thus, by connecting directly the motor-side input axle 19 to the engine-side input axle 18, it is possible to eliminate either of a pair of motor-side driving input axle 31 and motor-side driven input axle 33 shown in FIG. 2 and a pair of engine-side driving gear 30 and engine-side driven gear 32. Such elimination of the gears allows the driving apparatus 10 to be further miniaturized and, at the same time, the driving apparatus 10 to be made lighter in weight and lower in cost.

In the driving apparatus 10 shown in FIG. 11C, the motor-side input axle 19 is disposed between the engine-side input axle 18 and the output axle 20 and parallel to them, and the driving gear 31 fixed to the motor-side input axle 19 is engaged with: the driving gear 30 provided on the engine-side input axle 18; and the driven gear 32 provided on the output axle 20. Thereby, such an arrangement of the engine 13 and the motor 14 allows the driven gear 33 attached to the output axle 20 shown in FIG. 2 to be eliminated and allows the driving apparatus 10 to be further miniaturized. Additionally, it is possible to increase a degree of freedom in disposing the engine-side input axle 18 and the motor-side input axle 19.

Further, as another modified example in FIG. 2, the respective input axles 18 and 19 and output axle 20 may be disposed so that the driving gear 30 of the engine-side input axle 18 and the driven gear 32 of the output axle 20 are directly engaged as shown in FIG. 2 and the driving gear 31 of the motor-side input axle 19 is directly engaged with the driving gear 30 of the engine-side input axle 18.

In the driving apparatus 10 shown in FIG. 11D, the transmission 36 is incorporated between the driven gear 32 engaged with the driving gear 30 of the engine-side input axle 18 and the output axle 20. By such an arrangement, a degree of freedom in designing the power transfer channel can be enhanced. In each of the driving apparatus shown in FIGS. 11A to 1D, the clutch is incorporated in the transmission 36, and the transmission 36 has a function as a clutch. However, the clutch may be separated from the transmission 36 and be disposed.

In the driving apparatus shown in FIG. 11E, the transmission 36 is a belt type continuously variable transmission. Between the first input axle 18a and the second input axle 18b constituting the engine-side input axle 18, a clutch 85 for shifting them to a directly connecting state or a disconnecting state is separated from the transmission 36 and is provided. A power transmission element 88 such as a metal belt or a metal chain is bridged between a groove-width-variable primary pulley 86 provided on the second input axle 18b and a groove-width-variable secondary pulley 87 provided on the output axle 20. Therefore, a continuously variable transmission may be used as the transmission 36 or the clutch 85 may be attached to the engine-side input axle 18 so as to separate the transmission 36.

In the driving apparatus 10 shown in FIG. 11F, the transmission 36 is provided on the engine-side input axle 18, and there is provided, to the output axle 20, the clutch 85 for shifting a state of transmitting the engine power to the driving-wheels 17 or a power cutoff state of not transmitting it.

Figure 12:
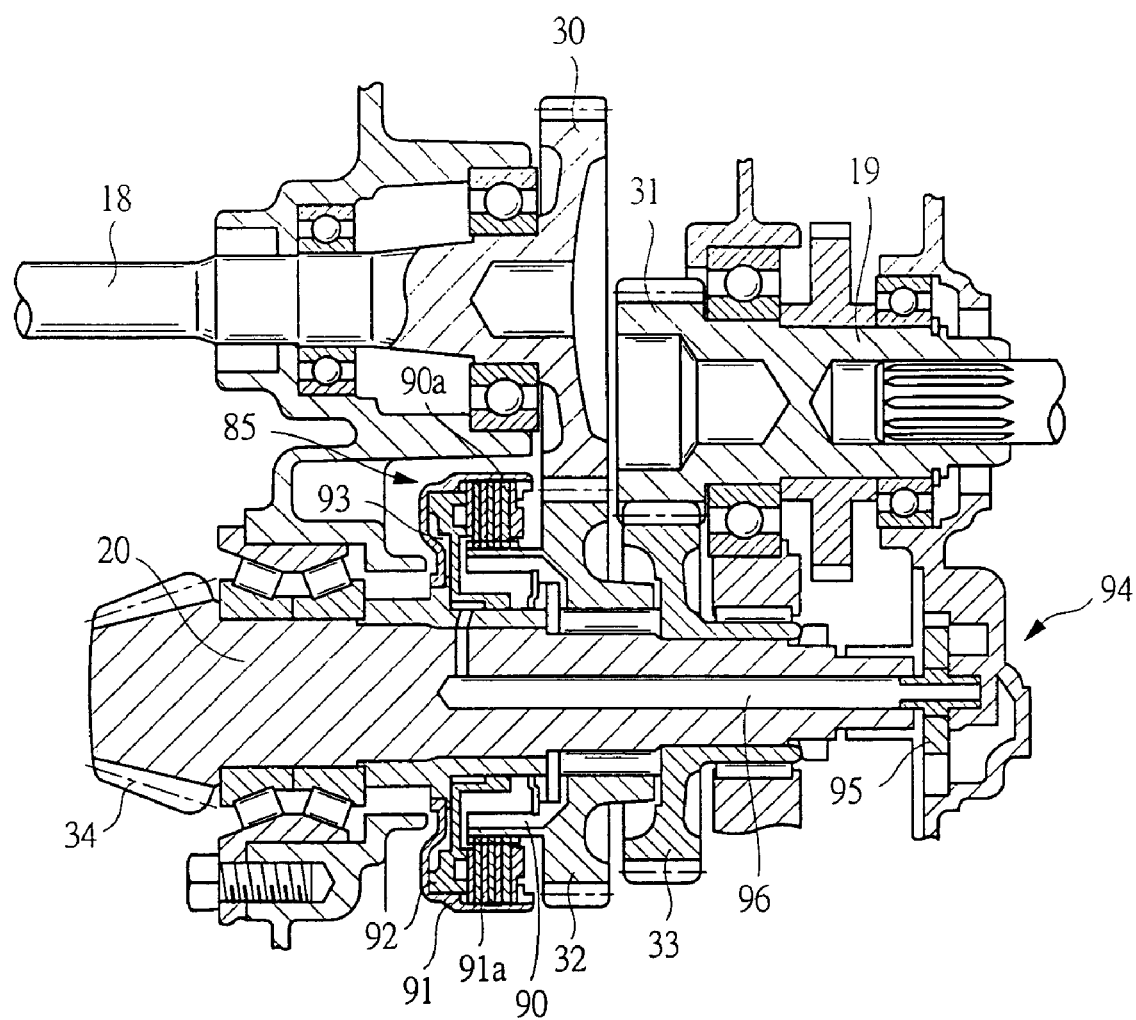
FIG. 12 is a cross-sectional view showing partially a driving apparatus incorporating a wet type multi-plate clutch.

FIG. 12 is a cross-sectional view showing a concrete example of the clutch 85 provided on the output axle 20 as shown in FIG. 11F. As shown in FIG. 12, a cylindrical clutch hub 90 is fixed to a side surface of the engine-side driven gear 32, and a clutch drum 91 disposed outside a radial direction of the clutch hub 90 is fixed to the output axle 20. A plurality of clutch plates 90a are slidably mounted axially outside the radial direction of the clutch hub 90, and a plurality of clutch plates 91a, coming respectively in contact with the clutch plates 90a, are slidably mounted axially inside the radial direction the clutch drum 91.

A hydraulic piston 92 is slidably mounted axially on the clutch drum 91. When working fluid is supplied to a hydraulic chamber 93 constituted by the hydraulic piston 92 and the clutch drum 91, the clutch plates 90a and 91a are operatively connected to one another. An oil pump 94 is incorporated in the gear case 21, and an inner rotor 95 of the oil pump 94 is attached to the output axle 20. In the output axle 20, there is formed an oil path 96 for guiding, to the hydraulic chamber 93, the working fluid discharged from the oil pump 94, and pressure of the working fluid supplied to the hydraulic chamber 93 is regulated by a regulating valve not shown.

Figure 13A:
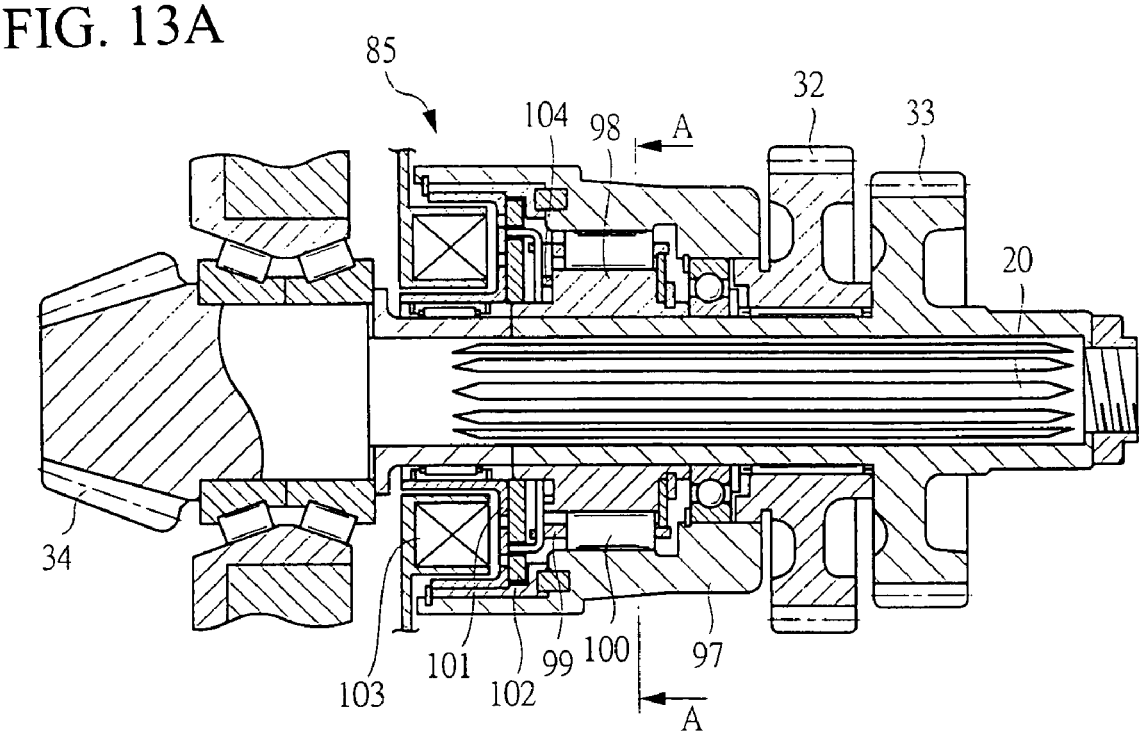
FIG. 13A is a cross-sectional view showing a driving apparatus incorporating a electromagnetic type two-way clutch.
Figure 13B:
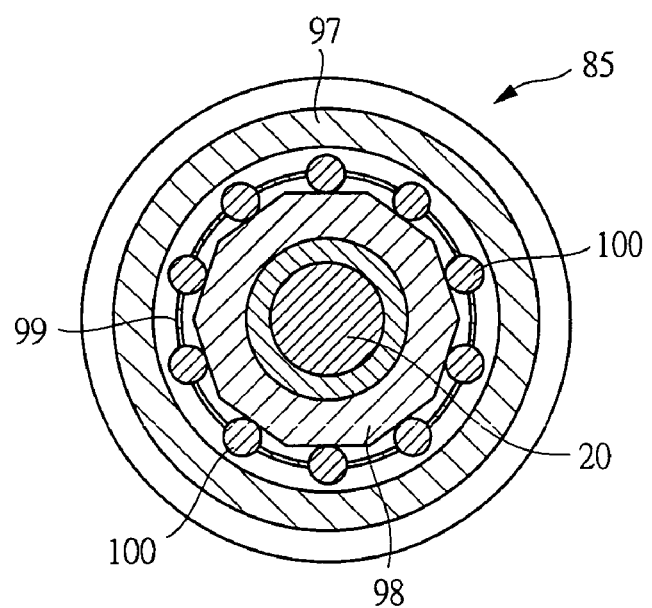
FIG. 13B is a cross-sectional view taken along line A—A shown in FIG. 13A.

FIG. 13A is a cross-sectional view showing another concrete example of the clutch 85 shown in FIG. 11F, and FIG. 13B is cross-sectional view taken along line A—A in FIG. 13A. The clutch 85 is an electromagnetic type two-way clutch, and comprises an outer ring 97 fixed to the engine-side driven gear 32 and an inner ring 98 fixed to the output axle 20. A plurality of cylindrical rollers 100 are disposed between the outer ring 97 and the inner ring 98, and the respective rollers 100 are held by a holder 99. An inner circumferential surface of the outer ring 97 facing the respective rollers 100 is formed cylindrically while an outer circumferential surface of the inner ring 98 is formed into a polygonal shape. A distance between the inner circumferential surface of the outer ring 97 and the outer circumferential surface of the inner ring 98 changes depending on positions disposed in a circumferential direction, and the longest distance is set to become longer than an outside dimension of each roller 100. A drive plate 101 fixed to the outer ring 97 and a driven plate 102 fixed to the holder 99 are mutually faced and a coil 103 disposed to face the drive plate 101 is fixed to the gear case 21.

When no current flows to the coil 103, a switch spring 104 provided between the inner ring 98 and the holder 99 holds the inner ring 98 and the rollers 100 at a positioning relation in which the rollers 100 come in no contact with both of the inner ring 98 and the outer ring 97 and which is shown in FIG. 13B. Therefore, when no current flows to the coil 103, the outer ring 97 becomes rotatable with respect to the inner ring 98, without intruding into the inner ring 98 through the rollers 100. Meanwhile, a current flows to the coil 103, the outer ring 97 and the holder 98 are integrally rotated since the driven plate 102 draws the drive plate 101. When the outer ring 97 and the holder 99 are rotation-moved, the rollers 100 are engaged between the outer circumferential surface of the inner ring 98, that is, a cam surface and the inner circumferential surface of the outer ring 97, whereby the outer ring 97 is integrally rotated along with the inner ring 98 in all rotating directions. Accordingly, the clutch is shifted to the power transmission state at the time of the flow of the current to the coil 103 while to the power cutoff state at the time of the flow of no current to the coil 103.

Since the above-mentioned electromagnetic type two-way clutch can be shifted by controlling the flow of the current to the coil 103, the transfer channels of the engine power can be easily sifted. Further, since lubrication of the inner ring 98, the outer ring 97, and the rollers 100 is sufficiently achieved by splashing a lubricant by the hypoid gear 35, it is unnecessary to provide the oil pump for lubrication. Additionally, it is unnecessary to increase lubricant's kinds housed in the gear case 21, so that the driving apparatus 10 can have a simple structure. Further, dragging torque in the power cutoff state can be suppressed so as to become smaller. Note that an electromagnetic clutch may be used as the clutch 85 instead of the electromagnetic type two-way clutch shown in FIG. 13. Note that, through the above-mentioned respective embodiments, members having the same function are denoted by the same reference symbol.

The present invention is not limited to the above-mentioned embodiments and can be variously altered and modified without departing from the gist thereof. For example, each of the driving apparatuses 10 shown in the drawings is applied to a front-wheel drive vehicle, but can be applied to a rear-wheel drive vehicle by transmitting power to rear wheels through the output axle 20 and applied to a four-wheel drive vehicle by transmitting power of the output axle 20 to rear wheels through a power transfer. Further, each of the driving apparatuses 10 shown in the drawings is arranged parallel to the vehicle, but may be transversally arranged toward a width direction of the vehicle.

According to the present invention, the transmission is provided to the engine-power transfer channel, so that, by changing the gear ratio when the vehicle travels with a low speed and heavy load, an engine output can be enhanced to drive the vehicle. The clutch for shifting the power transmission state of transmitting the engine power to the driving-wheels and the power cutoff state of not transmitting is provided to the engine-power transfer channel, and so the engine power and the motor power can be selectively transmitted to the output axle and power required for the motor is suppressed, whereby the driving apparatus can be miniaturized.

The entire disclosure of a Japanese Patent Application No. 2003-007954, filed on Jan. 16, 2003 including specification, claims, drawings and summary, on which the Convention priority of the present application is based, are incorporated herein by reference in its entirety.

What is claimed is:

1. A driving apparatus for an electric vehicle including an electric generator driven by an engine and a motor for driving driving-wheels by using electric power from said electric generator, the driving apparatus comprising:
   a case for accommodating said electric generator and said motor and fixing a stator of said electric generator and a stator of said motor;
   a generator rotor of said electric generator arranged in said stator of said electric generator and attached to a crankshaft of said engine to be directly driven by the said engine;
   an engine-side input axle linked to said crankshaft through a rotor of said electric generator and driven by said engine;
   a motor-side input axle linked to a motor rotor of said motor and driven by said motor;
   an output axle linked to said engine-side input axle and said motor-side input axle and transmitting power to said driving-wheels;
   a transmission provided in an engine-power transfer channel formed by said engine-side input axle and said output axle, and shifting a revolution speed of said engine-power transfer channel to a plurality of shift ranges; and
   a clutch provided in the engine-power transfer channel for shifting to a power transmission state of transmitting engine power to said driving-wheels and to a power cutoff state of not transmitting engine power to said driving-wheels.

2. The driving apparatus for an electric vehicle according to claim 1, wherein said transmission is a discontinuously variable transmission having at least two ranges of a high speed range and a low speed range.

3. The driving apparatus for an electric vehicle according to claim 1, wherein said transmission is a continuously variable transmission whose a gear ratio is continuously shiftable.

4. The driving apparatus for an electric vehicle according to claim 1, wherein said transmission is provided with a clutch shifting to a power transmission state of transmitting engine power to said driving-wheels and a power cutoff state of not transmitting.

5. The driving apparatus for an electric vehicle according to claim 1, wherein a clutch, shifting to a power transmission state of transmitting engine power to said driving-wheels and a power cutoff state of not transmitting, is provided on said engine-side input axle so as to be separated from said transmission.

6. The driving apparatus for an electric vehicle according to claim 1, wherein a clutch, shifting to a power transmission state of transmitting engine power to said driving-wheels and a power cutoff state of not transmitting, is provided on said output axle so as to be separated from said transmission.

7. The driving apparatus for an electric vehicle according to claim 1, wherein a clutch, shifting to a power transmission state of transmitting engine power to said driving-wheels and a power cutoff state of not transmitting, is provided between said output axle and a power transmission member linking said engine-side input axle and said output axle.

8. The driving apparatus for an electric vehicle according to claim 1, wherein a power-generating rotor of said electric generator is arranged parallel to said crankshaft, and said power-generating rotor is indirectly driven through an electric-power-generating power transmission member by said crankshaft.

9. The driving apparatus for an electric vehicle according to claim 1, wherein said motor-side input axle is coaxially arranged on said engine-side input axle, and said engine-side input axle and said output axle are linked through a power transmission member.

10. The driving apparatus for an electric vehicle according to claim 1, wherein said motor-side input axle is coaxially arranged on said output axle, and said engine-side input axle and said output axle are linked through a power transmission member.

11. The driving apparatus for an electric vehicle according to claim 1, wherein said engine-side input axle and said motor-side input axle are provided parallel to said output axle, and said engine-side input axle and said output axle are linked through a first power transmission member, and said motor-side input axle and said output axle are linked through a second power transmission member.

12. The driving apparatus for an electric vehicle according to claim 1, wherein said engine-side input axle, said motor-side input axle, and said output axle are disposed parallel to one another, and said engine-side input axle and said motor-side input axle are linked to said output axle through a power transmission member.

13. The driving apparatus for an electric vehicle according to claim 1, further comprising:
   a velocity detecting means for detecting a traveling speed of the vehicle; and
   a clutch controlling means for setting said engine-power transfer channel to a power transmission state when the traveling speed of the vehicle exceeds a predetermined traveling speed.

14. The driving apparatus for an electric vehicle according to claim 13, further comprising a motor controlling means for controlling power of said motor based on said traveling speed or a traveling load.

15. The driving apparatus for an electric vehicle according to claim 1, further comprising:
   a load detecting means for detecting a traveling load of the vehicle; and
   a clutch controlling means for setting said engine-power transfer channel to a power transmission state when the traveling load of the vehicle exceeds a predetermined load.

16. The driving apparatus for an electric vehicle according to claim 15, further comprising a shift controlling means for changing a gear ratio of said transmission based on the traveling load of the vehicle when said engine-power transfer channel is in a power transmission state.

* * * * *